US009300907B2

(12) United States Patent
Schwartze (10) Patent No.: US 9,300,907 B2
(45) Date of Patent: Mar. 29, 2016

(54) METHOD FOR HANDLING INTERFERENCE DURING THE TRANSMISSION OF A CHRONOLOGICAL SUCCESSION OF DIGITAL IMAGES

(75) Inventor: Jurgen Schwartze, Schwerte (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/346,472

(22) PCT Filed: Jul. 25, 2012

(86) PCT No.: PCT/EP2012/003147
§ 371 (c)(1),
(2), (4) Date: May 1, 2014

(87) PCT Pub. No.: WO2014/015884
PCT Pub. Date: Jan. 30, 2014

(65) Prior Publication Data
US 2014/0232812 A1    Aug. 21, 2014

(51) Int. Cl.
*H04N 7/14* (2006.01)
*H04N 19/65* (2014.01)
*H04N 7/15* (2006.01)

(52) U.S. Cl.
CPC .............. *H04N 7/141* (2013.01); *H04N 7/147* (2013.01); *H04N 7/157* (2013.01); *H04N 19/65* (2014.11)

(58) Field of Classification Search
CPC ....... H04N 19/65; H04N 7/141; H04N 7/147; H04N 7/157
USPC ............. 345/473, 520, 589, 440; 348/14.01, 348/14.12, 42, 46, 497; 600/443; 704/235, 704/258; 709/217; 726/28; 375/240.27; 382/118, 168, 173
See application file for complete search history.

(56) References Cited

U.S. PATENT DOCUMENTS

| | | | | |
|---|---|---|---|---|
| 5,684,720 A * | 11/1997 | Hein | | 702/185 |
| 5,924,989 A * | 7/1999 | Polz | | 600/443 |
| 6,603,501 B1 * | 8/2003 | Parry | | H04N 7/147 348/14.11 |
| 7,110,946 B2 * | 9/2006 | Belenger et al. | | 704/235 |
| 7,206,016 B2 * | 4/2007 | Gu | | H04N 7/152 348/14.08 |

(Continued)

FOREIGN PATENT DOCUMENTS

EP     1763242 A1    3/2007
WO     9743857       11/1997

OTHER PUBLICATIONS

Written Opinion of the International Searching Authority for PCT/EP2012/003147 dated Apr. 12, 2013 (Form PCT/ISA/237).

(Continued)

*Primary Examiner* — Gerald Gauthier
(74) *Attorney, Agent, or Firm* — Buchanan Ingersoll & Rooney PC (57) ABSTRACT

A method for handling interference during the transmission of a chronological succession of digital images (I) from a sender (S) to at least one receiver (R), in which the images to be transmitted show the face of a Speaker at least intermittently, involves images in the chronological succession that are unable to be decoded, or unable to be decoded satisfactorily, on account of the interference being replaced by synthentic images (P) at the receiver. The synthetic images are produced using phonetic data (LD) that are or have been extracted from digital voice data (SD) for the Speaker by means of phonetic recognition, the digital voice data being or having been transmitted together with the digital image data (I).

20 Claims, 3 Drawing Sheets

(56) References Cited

U.S. PATENT DOCUMENTS

| | | | |
|---|---|---|---|
| 7,861,125 B2* | 12/2010 | Yamazaki et al. | 714/47.1 |
| 7,882,199 B2* | 2/2011 | Ludtke et al. | 709/217 |
| 8,253,778 B2* | 8/2012 | Atsushi | A61B 19/52 348/42 |
| 8,285,044 B2* | 10/2012 | Niem | G06K 9/00771 382/103 |
| 8,325,192 B2* | 12/2012 | Cao et al. | 345/473 |
| 8,326,002 B2* | 12/2012 | Hill | 382/118 |
| 8,713,703 B2* | 4/2014 | Fisk et al. | 726/28 |
| 8,750,388 B2* | 6/2014 | Okajima | 375/240.27 |
| 8,929,655 B2* | 1/2015 | Takeuchi | 382/168 |
| 2001/0027395 A1* | 10/2001 | Sakai et al. | 704/258 |
| 2002/0036707 A1* | 3/2002 | Gu | H04N 7/152 348/497 |
| 2006/0221083 A1* | 10/2006 | Guitarte Perez et al. | 345/473 |
| 2009/0244085 A1* | 10/2009 | Nakazawa | 345/589 |
| 2010/0066813 A1* | 3/2010 | Jorke | H04N 13/0033 348/46 |
| 2013/0038617 A1* | 2/2013 | Mody | 345/520 |
| 2014/0232812 A1* | 8/2014 | Schwartze | 348/14.01 |

OTHER PUBLICATIONS

International Search Report for PCT/EP2012/003147 dated Apr. 12, 2013 (Forms PCT/ISA/220, PCT/ISA/210).

International Preliminary Report on Patentability and Written Opinion for PCT/EP2012/003147 dated Jan. 27, 2015 (Form PCT/IB/373) (English Translation).

International Preliminary Report on Patentability and Written Opinion for PCT/EP2012/003147 dated Jan. 27, 2015 (Form PCT/ISA/273) (German Translation).

* cited by examiner

METHOD FOR HANDLING INTERFERENCE DURING THE TRANSMISSION OF A CHRONOLOGICAL SUCCESSION OF DIGITAL IMAGES

CROSS REFERENCE TO RELATED APPLICATIONS

This application is the United States national phase under 35 U.S.C. §371 of PCT International Application No. PCT/EP2012/003147, filed on Jul. 25, 2012.

BACKGROUND OF THE INVENTION

1. Field of the Invention

Embodiments relate to methods to handle errors when transferring a chronological sequence of digital images.

2. Background of the Related Art

When transferring chronological sequences of digital images via a transmission channel, i.e., when transferring video data via telephone lines, data communication lines, or via a radio link, e.g., for video telephony, image data is transferred in digital form from one sender to one or more receivers. Frequently, as with video telephony, for example, audio data is also transferred together with the image data. The audio data thus frequently consists primarily of voice data, i.e., of digital representations of a voice signal produced by a person shown in the transferred images.

Due to the shift in technology from the traditional telephony to internet telephony (also known as Voice over IP or VoIP), value-added services that require more bandwidth between the communication participants are rapidly gaining significance. These can include real-time services (e.g., an audio transmission with high-quality codecs or video telephony), or parallel communication mechanisms without real-time requirements, as with so-called "messaging" or "chat." Problems can arise with these value-added services, because they require that more bandwidth be available between the communication partners throughout the entire communication period. However, this requirement cannot always be supported, particularly with mobile communication partners that are reliant on wireless data communication. It is thus possible during a train ride where there was initially enough bandwidth for audio and video communication, for the quality of the network connection to subsequently dwindle such that the bandwidth required to conduct audio and video communication is temporarily unavailable.

To account for the limitations characterized by the properties of the transmission channel used with regard to the available bandwidth and any errors occurring, the image data and voice data to be transferred will be regularly "encoded." The so-called encoding regularly reduces the data volume to be transferred with an irrelevance reduction and a redundancy reduction. To be able to protect the reference data (extensively) freed of redundancy from errors during the transfer, a certain amount of redundancy is regularly added again in the form of so-called error-correction codes.

For audio transmission, it is possible to react to a reduction in available bandwidth by dynamically switching to highly compressing codecs. In the area of video transmission, however, this is only possible to a very limited extent due to the substantial minimum bandwidth required for suitable moving image transmissions. If the available bandwidth falls below a certain value, today the image transmission will usually be adjusted, and depending on the implementation in the communication terminal, either no image will be shown at all, or a locally available contact photo will be shown, if applicable.

This method is particularly unsatisfactory in the case of video conferences, because participants with insufficient bandwidth will have to participate in the conference in these cases without transferring their image, which causes them to be perceived as inadequate and makes them a second-class conference participant.

BRIEF SUMMARY OF THE INVENTION

A workaround for this could be to use a selection of video codecs or image resolutions based dynamically on the available bandwidth.

Despite these solutions, error-free operation of this type of transmission system cannot—or cannot always—be achieved. Embodiments may therefore be directed to improving the behavior of transmission systems for chronological sequences of digital images with regard to any potential errors arising as far as possible.

Embodiments may provide methods to handle errors when transferring a chronological sequence of digital images from a sender to at least one receiver, in which the images to be transferred show the face of the speaker at least intermittently, and in which one or more images of the chronological sequence that cannot be decoded due to the error, or cannot be decoded in a satisfactory manner, are replaced with one or more synthesized images on the receiver end or on the way to the receiver. The synthesized image or images are or were selected or generated using sound data that is or was extracted from the speaker's digital voice data using sound recognition, whereupon the digital voice data is or was transferred together with the digital image data.

BRIEF DESCRIPTION OF THE FIGURES

In the following, preferred embodiments are described in more detail with the help of figures.

LIST OF REFERENCE SYMBOLS

S Sender
R Receiver
I Digital images to be transferred
P Synthesized images
SD Voice data
LD Sound data
LDE Extraction of sound data from voice data
PG Generation of selection of synthesized images
M Mixer
TC Transmission path, transmission equipment
L Library

DETAILED DESCRIPTION OF THE INVENTION

As noted above, a workaround for this could be to use a selection of video codecs or image resolutions based dynamically on the available bandwidth.

Despite these solutions, error-free operation of this type of transmission system cannot—or cannot always—be achieved. Embodiments may therefore be directed to improving the behavior of transmission systems for chronological sequences of digital images with regard to any potential errors arising as far as possible.

Embodiments may provide methods to handle errors when transferring a chronological sequence of digital images from a sender to at least one receiver, in which the images to be transferred show the face of the speaker at least intermittently, and in which one or more images of the chronological sequence that cannot be decoded due to the error, or cannot be decoded in a satisfactory manner, are replaced with one or more synthesized images on the receiver end or on the way to the receiver. The synthesized image or images are or were selected or generated using sound data that is or was extracted from the speaker's digital voice data using sound recognition, whereupon the digital voice data is or was transferred together with the digital image data.

In the context of this description, a chronological sequence of digital images is considered a sequence l(1), l(2), . . . , l(n−1), l(n), l(n+1), . . . , in which every element l(n) in the sequence is a digital image, whereupon the sequence index n is a natural number, and defines a chronological order relation. Consecutive images in the sequence thus correspond to consecutive points in time. Every element in the sequence is a digital image, i.e., a data structure that corresponds to a two-dimensional arrangement of a number of digital image values, also called pixels, or that is converted to this type of two-dimensional arrangement of digital image values, or can at least be approximately represented by this type of two-dimensional arrangement of digital image values.

In encoded form, these types of chronological sequences of digital images frequently take another form. To reduce the data volumes to be transferred, the elements of an image sequence are often not encoded individually, but rather a so-called prediction method is used to compute intermediate images from previous and/or subsequent images in a chronological sequence of digital images. These often have a significantly smaller data volume as the individually encoded images, and a receiver can use decoding to compute a sequence of individual images from these again. All of these potential forms of encoded, unencoded, or decoded image sequences should be encompassed in this context under the phrase, a chronological sequence of digital images.

In this context, the transfer of a chronological sequence of digital images is considered every method, in which a chronological sequence of digital images is transferred from a sender to at least one receiver. Important examples of these types of transfers are video telephony, video streaming, digital television, and similar methods. The transfer of a chronological sequence of digital images is also called video transmission in this context.

In this context, a sender of a chronological sequence of digital images is considered any equipment that represents the starting point of a transfer of a chronological sequence of digital images. Important examples for this type of sender include video telephones, video cameras, or so-called smartphones with access to a transmission channel to transfer chronological sequences of digital images, e.g., with access to a telephone network, internet access, or with access to a (wireless) computer network.

In this context, a receiver of a chronological sequence of digital images is considered any equipment that represents the ending point of a transfer of a chronological sequence of digital images. Important examples for this type of receiver include video telephones, computer monitors, or so-called smartphones with access to a transmission channel to transfer chronological sequences of digital images, e.g., with access to a telephone network, internet access, or with access to a (wireless) computer network.

In this context, a chronological sequence of digital images that shows the face of a speaker at least intermittently is considered an image sequence, in which a number of consecutive images show a person's face or part of a person's face, preferably including at least the mouth section of the face, who is producing the voice signals, which are transferred as digital voice data together with the chronological sequence of digital images. These image sequences and the associated voice data are frequently transferred in video telephony, for example.

In this context, an error, particularly an error when transferring a chronological sequence of digital images, is considered an incident or an event that adversely affects the transferring and/or the playback of transferred image data, particularly chronological sequences of digital images. Examples for these types of errors include data loss or transmission errors. These errors can be caused by an intermittent reduction in the available bandwidth, which can therefore be considered for their part an error in this sense. Another example of these errors are the errors that occur with mobile communication, in which a receiver who is in motion (e.g., in a moving auto or riding a train) moves between different radio cells, and is thus subject to continuously fluctuating connection quality.

In this context, decoding is considered any procedure to restore the original image sequence from an encoded image sequence. An important example for a video decoding method is the method according to the MPEG-4 standard.

In this context, a synthesized image is considered a digital image that was not or not exclusively ascertained by decoding a transferred encoded chronological sequence of digital images, but rather that was ascertained with the use of additional data, particularly of voice data from at least one decoded image or from an encoded chronological sequence of digital images, to replace at least one digital image, which—as a result of an error—could not be ascertained or could not be ascertained at a satisfactory quality without the use of additional data. A chronological sequence of synthesized images is also called moving image simulation in this context.

In this context, an expression according to the digital voice data "together with" the digital image data should be or have been transferred, including cases where the voice and image data are transported simultaneously but across different paths.

Preferably, in the event of intermittently or continuously insufficient available bandwidth for video transmissions, a moving image simulation will be generated for the conversation partner (receiver) based on a real-time sound analysis of the voice connection. This moving image simulation is preferably displayed until sufficient bandwidth is available for video transmission. This particularly necessitates continuous bandwidth monitoring for the communication connection used for the video transmission. As soon as the bandwidth for the chose application, preferably for video telephony, is no longer sufficient, the moving image simulation according to the invention, i.e., the replacement of missing transferred images with synthesized images, is used, in which it preferably switches to the moving image simulation.

Preferably, the moving image simulation according to the invention is based on at least one digital image of the speaker or his face that is saved on the receiver end. This is preferably an image that was transferred at a point in time when the bandwidth was still sufficient. However, it can also be a so-called snapshot of the current communication connection, a still image transferred in advance, or a number of still images of the speaker transferred in advance. Alternately, it can also be a contact photo previously available on the receiver end, which can be obtained from messaging services or so-called social networks.

These types of images or this type of image present on the receiver end can preferably be used to compute a chronological sequence of modified, synthesized images that preferably reproduce or remodel the typical facial features when pronouncing individual sounds. Preferably, first the still image or the other images serving as a basis for ascertaining the synthesized images are analyzed, i.e., preferably suitable or necessary fixed points like the eyes, brows, nose, mouth, lips, etc. are located. Preferably, a synthesized image is computed for every sound extracted from the voice data.

Preferably in step with the voice connection, and preferably adhering to the real-time requirements as closely as possible, a sound analysis (or also sound data extraction) is performed on the received or transferred audio stream, i.e., the data stream of voice data. It may be necessary or useful to transcode the audio data into a phonetically accurate audio format (phonetically accurate codec). Preferably, a synthesized image corresponding to an extracted sound or a chronological sequence of synthesized images corresponding to an extracted sound or an extracted sound sequence is reproduced at the receiver end until a subsequent sound or a subsequent extracted sound sequence has been detected. To improve the quality, additional transition images are preferably computed from two sound images here. On the receiver end, this creates the impression that the video image of the communication partner (i.e., the speaker) is transferred preferably free of errors or with only minor errors in sync with the existing voice connection, even though this transmission is actually experiencing an error, in some circumstances even errors that would make it impossible to actually reproduce transferred video images during these times.

In this way, embodiments may help resolve some problems that can occur particularly as a result of a disruption in media (i.e., an image loss) with fluctuating transfer bandwidths in video telephony. The perception for other communication participants, particularly in video conferences, is decidedly improved.

Preferably, the sound image representations during an actual video call—instead of being computed—will be recorded and replayed in situations where there is insufficient bandwidth available, particularly where the speaker does not have sufficient bandwidth. Sound image representations can preferably also be created by conference participants themselves, e.g., with the use of a suitable software application, and prepared for contacts to download. The method according to the invention can optionally be used at every communication terminal where you want to use the associated performance features, or centrally in a video conference server that aggregates the individual video streams and moving image simulations into a single video stream.

In this context, the voice data is considered a data stream of digital audio data accompanying a video transmission. This audio data can be transferred in encoded form to keep the bandwidth necessary to transfer it as low as possible.

In this context, sound data is considered a preferably symbolic sequence of digital data, whereupon every sequence element or symbol preferably identifies a sound, i.e., a phoneme or a sound chain. Partial sequences of these types of sound data sequences are preferably called sound chains. Preferably, the sounds or sound chains are characterized using a phonetic alphabet, e.g., using the International Phonetic Alphabet IPA ("International Phonetic Alphabet" page. In: Wikipedia, The Free Encyclopedia. Version: Jun. 16, 2012, 20:28 UTC (Accessed: Jul. 2, 2012, 19:37 UTC)), or using SAMPA, a subset of the IPA that uses 7-bit ASCII characters.

In this context, sound recognition or sound data extraction is considered a method to obtain sound data from voice data. An example of this type of method is described in the publication from Harald Finster and Jürgen W. Meyer (1990), "Automatische Lauterkennung aus fließendem Text mit Hilfe mehrschichtiger Neuronaler Netze" (Automatic sound recognition from flowing text using multi-layer neural networks) in ASST '90, 7. Aachener Symposium für Signaltheorie: Modellgestützte Signal-Verarbeitung, (ASST '90, 7th Aachen symposium for signal theory: Model-driven signal processing), Walter Ameling (Ed.). Springer-Verlag, London, UK, 299-304. An introductory overview of the current state of voice recognition can be found on the "Voice recognition" page on Wikipedia, The Free Encyclopedia. Version: Wednesday, Jun. 20, 2012, 9:35 AM UTC (Accessed: Jul. 2, 2012, 19:48 UTC).

The expression "is or was" or similar expressions in this context should be considered to mean that, depending on the chosen embodiment of the invention, the respective procedure or process step will either be executed during the transfer of the respective data, or it was executed at a point in time prior to the transfer of the respective data. This makes it possible, in particular, to generate the sound data or the synthesized images, particularly in real time during the transfer of the image sequences, or to have generated the sound data or the synthesized images in advance, and if applicable to have transferred these to a receiver in advance.

It is preferable to design a method, in which the transfer error is or was caused by an intermittent reduction in the available data rate. The intermittent reduction in the available data rate is also an important potential cause for a transfer error in this sense, but not the only possible cause. Other potential causes are transfer errors from external interference, like electromagnetic interference fields, for example, or adverse propagation conditions for electromagnetic waves.

In this context, available data rate or available bandwidth is considered the data rate or bandwidth that a communication connection has available for a transmission channel, which this communication connection has to share with other communication connections, if applicable. It is preferable to design a method, in which at least one synthesized image is or was selected or generated on the receiver end, preferably during or before the transfer of video data.

The expression "on the receiver end," in this context, should be considered to mean that the respective procedures or equipment are executed or are located at the end of the transmission path between the sender and the receiver.

It is preferable to design a method, in which at least one synthesized image is generated during the transfer. This makes it possible to make this synthesized image available without having to take any preparatory measures. The expressions "during the transfer" and "on the transmission path" or "on the way to a receiver" or "on the transmission path between the sender and a receiver" should be considered, in this context, to mean that the associated procedures are executed in real time or after being sent by the sender and before being received by the receiver.

It is preferable to design a method, in which the sound data is extracted from the voice data on the receiver end during the transfer.

It is preferable to design a method, in which a library of synthesized images for at least one speaker is or was added on the receiver end, preferably during or before the transfer of video data.

In this context, a library of synthesized images is considered a number of synthesized images that is or was saved to equipment capable of storing digital image data. Preferably, there is an association between the images of this type of library and any potential sounds that can be extracted from the voice data of a speaker using sound data extraction, which can be used to identify at least one synthesized image in the library that matches a sound. The images in this type of library can be generated in a first phase of the transfer of video data by equipment capable of generating synthesized images, and saved to the library in order to be selected in a second phase of the transfer of video data by equipment capable of selecting synthesized images based on the extracted sound data, and transferred in place of the original images.

It is preferable to design a method, in which at least one synthesized image is or was generated on the transmission path between the sender and a receiver, preferably during or before the transfer of video data. This makes it possible to use the invention in this context with senders and/or receivers that do not have to be specially equipped for the invention.

It is preferable to design a method, in which the sound data is extracted from the voice data on the transmission path between the sender and a receiver during the transfer. This makes it possible to use the invention in this context with senders and/or receivers that do not have to be specially equipped for the invention.

It is preferable to design a method, in which a library of synthesized images for at least one speaker is or was added on the transmission path between the sender and a receiver, preferably during or before the transfer of video data. This makes it possible to use the invention in this context with senders and/or receivers that do not have to be specially equipped for the invention.

In addition, libraries do not have to be added and saved to multiple terminals.

Embodiments may include communication equipment with means of implementing a method according to the invention, preferably according to one of the exemplary embodiments described here.

Embodiments handle errors when transferring a chronological sequence of digital images I from a sender S to at least one receiver R.

In the process, the images to be transferred show the face of a speaker at least intermittently. One or more images of the chronological sequence that cannot be decoded due to the error, or cannot be decoded in a satisfactory manner, are replaced with one or more synthesized images P on the receiver end or on the way to the receiver. The synthesized images are or were generated using sound data LD that is or was extracted from the speaker's digital voice data SD using sound recognition or sound extraction, whereupon the digital voice data is or was transferred together with the digital image data I.

Figure 1:
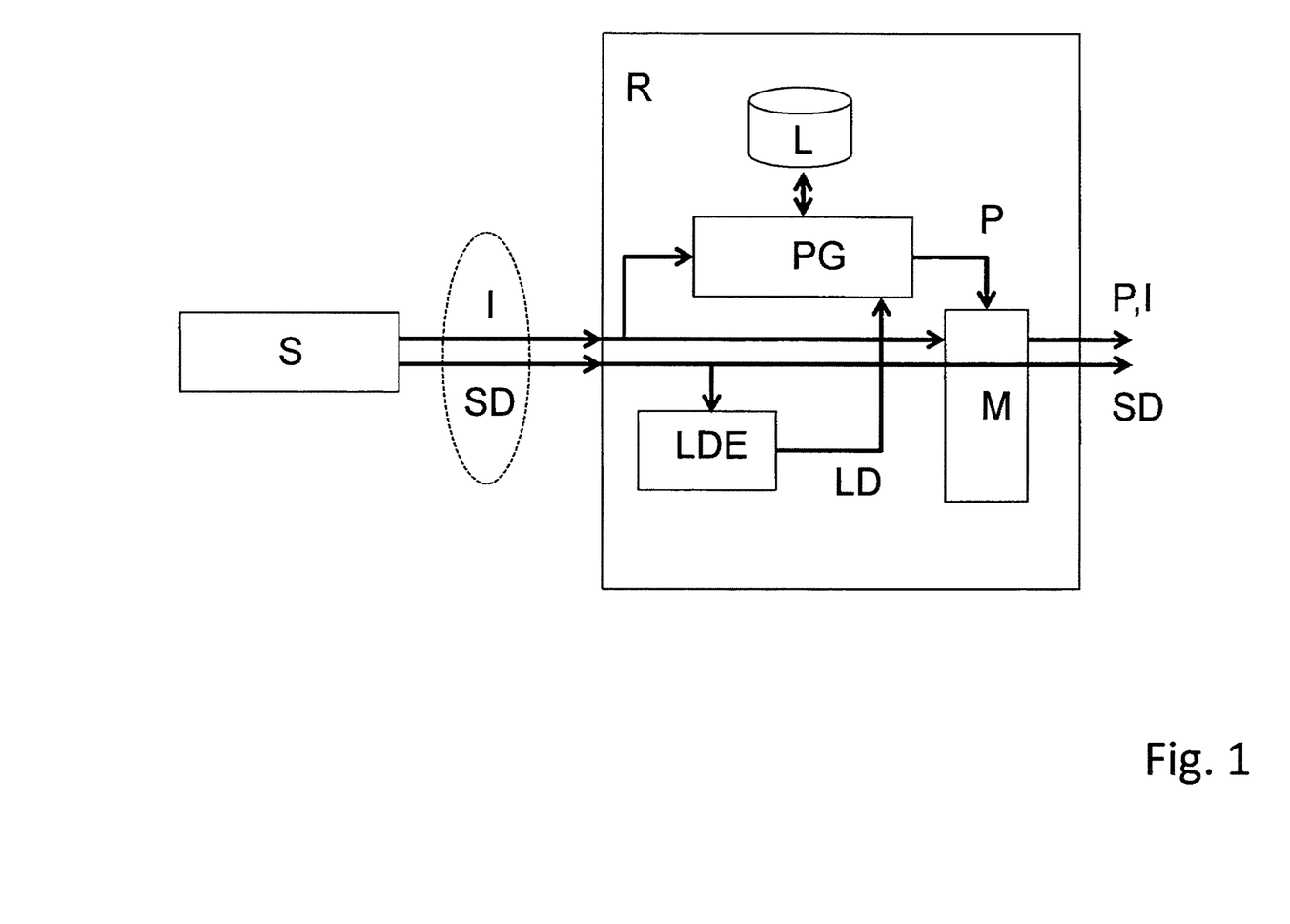
FIG. 1 schematically illustrates a preferred exemplary embodiment of the invention.

In the exemplary embodiment of the invention shown in FIG. 1, a sender S transfers image data I together with voice data SD to a receiver R. Particularly in the case of video telephony, the moving images I (also known as a video stream) show a speaker, whose voice signals are recorded by a microphone, digitalized, and transferred, preferably encoded, in the form of voice data SD.

If a transfer error then occurs, particularly due to an intermittent reduction in the available data rate or bandwidth, then the image or some images in the image sequence I are replaced with synthesized images P. At the output of the receiver, a mixer M must be included in the receiver R, which outputs a mixed image sequence P,I in place of the original image sequence I. In the mixed image sequence, one or more of the original images I have been replaced with synthesized images P. The voice data is preferably output unchanged.

In the exemplary embodiment of the invention shown in FIG. 1, the synthesized images P are generated or selected on the receiver R end. To achieve this, equipment PG to generate or select synthesized images is included in the receiver R, and this selects or generates the synthesized images P based on the sound data. In the case of selecting synthesized images with the equipment PG, a number of synthesized images are stored in the receiver. The equipment PG selects the synthesized images from these based on the sound data. These synthesized images were preferably created at an earlier point in time by the equipment PG, or received by the receiver R. The transfer of the synthesized images to the receiver can take place via the same communication connection that will later handle the video transmission; however, it can also take place via a different communication connection, e.g., via a social network that makes these types of images available.

Alternately, at least one synthesized image P is generated by the equipment PG during the transfer of the image sequence I. In any event, the synthesized images are generated or selected based on the sound data LD, since the synthesized images should match the sound data that should match the synthesized facial expressions of the speaker shown in the synthesized images, and thus to the sound of the voice data produced by the speaker simultaneously.

In FIG. 1, the sound data LD is extracted from the voice data SD on the receiver R end, preferably during the transfer. To achieve this, there is a sound data extraction LDE in the receiver.

Preferably, a library L of synthesized images P of at least one speaker is or was added during or before the transfer of video data I on the receiver R end.

Figure 2:
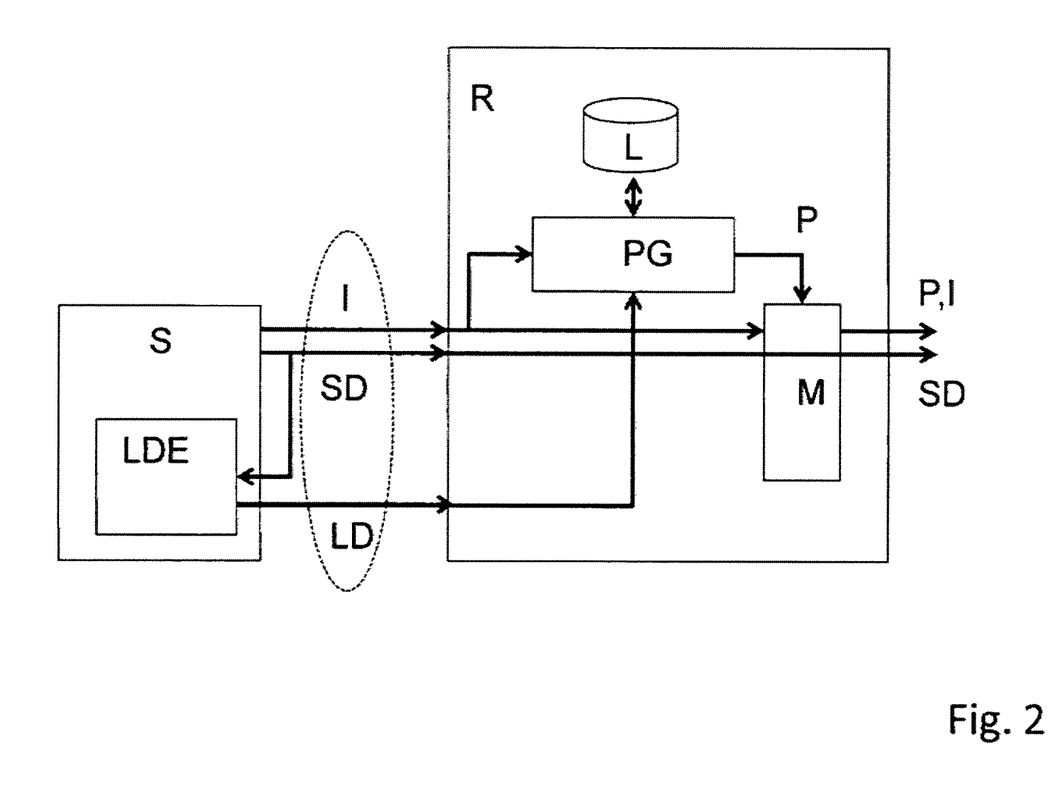
FIG. 2 schematically illustrates a second preferred exemplary embodiment of the invention.

In the exemplary embodiment of the invention shown in FIG. 2, the sound data extraction LDE takes place in the sender S. The sender S therefore transfers the sound data LD to the receiver R in addition to the video data I and the voice data SD.

Figure 3:
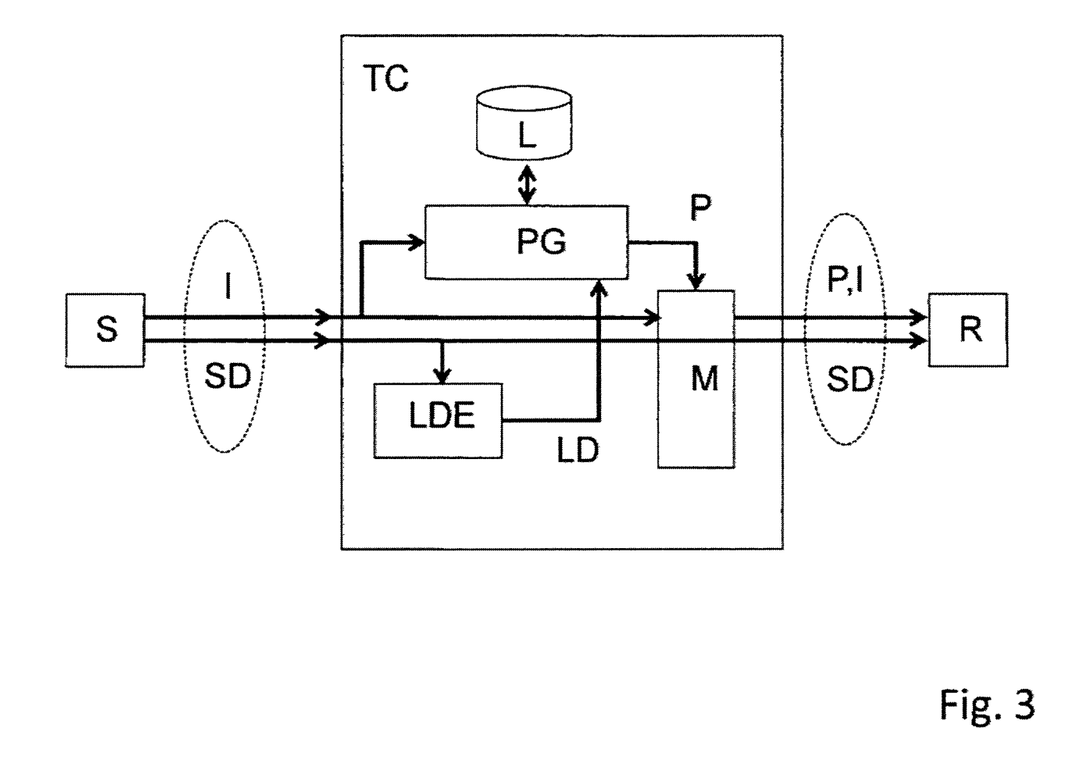
FIG. 3 schematically illustrates a third preferred exemplary embodiment of the invention.

In the exemplary embodiment of the invention shown in FIG. 3, at least one synthesized image P is or was generated or selected on the transmission path TC between the sender S and a receiver, preferably during or before the transfer of video data. Therefore, this exemplary embodiment includes equipment PG to generate or select synthesized images and a sound data extraction LDE in equipment TC on the transmission path from the sender S to the receiver R. In this exemplary embodiment, the sound data LD is extracted from the voice data SD on the transmission path between the sender and a receiver during the transfer.

Preferably, a library L of synthesized images of at least one speaker is or was added, preferably during or before the transfer of video data, on the transmission path between the sender and a receiver.

One or more features of the exemplary embodiments of the invention described here can be combined in different ways with one another by an expert to create other exemplary embodiments that are cannot be exhaustively detailed here.

I claim:

1. A method to handle errors during a transfer of a chronological sequence of digital images from a sender to at least one receiver, wherein the digital images to be transferred show the face of the speaker at least intermittently, the method comprising:

replacing one or more digital images of the chronological sequence that cannot be decoded due to an error or cannot be decoded in a satisfactory manner with one or more synthesized images on a receiver or en route to the receiver, generating or selecting the one or more synthesized images to replace the one or more digital images that cannot be decoded due to an error or cannot be decoded in a satisfactory manner using sound data extracted-from digital voice data of the speaker via sound recognition, and transferring digital voice data together with the digital images; and wherein the error is comprised of at least one of a transfer error that is a result of an intermittent reduction in an available bandwidth, a transmission error that is a result of data loss that occurs during a transmission of the digital images, and a transmission error that is a result of a fluctuation in connection quality for a connection over which the digital images are being transferred.

2. The method of claim 1, wherein the error is the transfer error that is the result of the intermittent reduction in the available data rate.

3. The method of claim 1, comprising generating or having generated at least one synthesized image by the receiver.

4. The method of claim 1, comprising generating at least one synthesized image during the transfer of the digital voice data together with the digital images.

5. The method of claim 1, comprising extracting sound data from the digital voice data on the receiver during the transfer of the digital voice data together with the digital images.

6. The method of claim 1, comprising maintaining a library of synthesized images of at least one speaker on the receiver.

7. The method of claim 1, comprising generating at least one synthesized image on a transmission path that traverses through at least one telecommunications network between the sender and the at least one receiver.

8. The method of claim 7, comprising extracting sound data from the digital voice data on the transmission path during the transfer of the digital voice data together with the digital images.

9. The method of claim 1, comprising adding a library of synthesized images of at least one speaker on a transmission path between the sender and the at least one receiver.

10. Communication equipment that handles errors during a transfer of a chronological sequence of digital images from a sender to at least one receiver, wherein the images to be transferred show a face of the speaker at least intermittently, the communication equipment configured to handle the errors by a method comprising:

receiving digital voice data of the speaker together with the digital images during the transfer;

generating or selecting one or more synthesized images to replace one or more of the received digital images of the chronological sequence that cannot be decoded due to an error or cannot be decoded in a satisfactory manner using sound data extracted from the digital voice data using sound recognition;

replacing one or more of the received one or more digital images that cannot be decoded due to an error or cannot be decoded in a satisfactory manner with one or more of the synthesized images to produce a mixed image sequence that replaces original image sequencing of the chronological sequence such that the one or more synthesized images and the digital images that were decoded without error and were decoded such that the digital images were decoded in a satisfactory manner are outputtable while the one or more digital images that were replaced by the one or more synthesized images are not included in the mixed image sequence; and wherein the error is comprised of at least one of a transfer error that is a result of an intermittent reduction in an available bandwidth, a transmission error that is a result of data loss that occurs during a transmission of the digital images, and a transmission error that is a result of a fluctuation in connection quality for a connection over which the digital images are being transferred.

11. The communication equipment of claim 10, wherein said communication equipment is configured to identify the speaker from the voice data.

12. The communication equipment of claim 10, wherein said communication equipment generates synthesized images from sound data of the voice data and from digital image data to be transferred or received such that the one or more synthesized images comprise images of the face of the speaker that are modified such that facial features of the speaker in the synthesized images include facial features of the speaker that are made to pronounce sounds of the speaker to be output from the digital voice data.

13. A method of processing image data comprising digital images of a chronological sequence that is sent with voice data via at least one telecommunications network from a sender to at least one receiver, the method comprising:

identifying a speaker of the voice data using sound recognition on the voice data;

determining that at least one of the digital images cannot be decoded due to an error or cannot be decoded to meet a pre-selected quality level, wherein the error is a transfer error that is a result of an intermittent reduction in an available bandwidth, a transmission error that is a result of data loss that occurs during a transmission of the digital images, or a transmission error that is a result of a fluctuation in connection quality for a connection over which the digital images are being transferred;

generating or selecting one or more synthesized images to replace the at least one of the digital images that cannot be decoded due to an error or cannot be decoded to meet the pre-selected quality level based on the identification of the speaker such that the one or more synthesized images is comprised of image data of the identified speaker; and replacing the at least one of the digital images of the chronological sequence that cannot be decoded due to an error or cannot be decoded to meet a pre-selected quality level with the one or more synthesized images on a receiver or en route to the receiver.

14. The method of claim 13, wherein the one or more synthesized images are generated or selected by a process comprising:

determining the speaker from the voice data based on the sound recognition identifying the speaker; and communicating with a library of synthesized images of the identified speaker for selecting the one or more synthesized images.

15. The method of claim 14, wherein the library is stored in non-transitory memory of the receiver or is stored in a device that is remote from the receiver.

16. The method of claim 13, wherein the one or more synthesized images are generated or selected by a process comprising:

generating the one or more synthesized images from previously received digital images of the chronological sequence, the one or more synthesized images comprising images of the determined speaker that are modified such that facial features of the speaker include facial features of the speaker that are made to pronounce sounds of the speaker to be output from the voice data.

17. The method of claim 16, wherein the replacing of the at least one of the digital images of the chronological sequence that cannot be decoded due to an error or cannot be decoded to meet a pre-selected quality level with the one or more synthesized images on a receiver or en route to the receiver comprises:
   mixing the voice data with the one or more synthesized images and the digital images to output a mixed image sequence that replaces original image sequencing of the chronological sequence such that the one or more synthesized images and the digital images that were decoded without error and were decoded such that the digital images met the pre-selected quality level are outputtable while the one or more digital images that were replaced by the one or more synthesized images are not included in the mixed image sequence; and
   the mixed image sequence configured so that the one or more synthesized images is outputtable such that the modified facial features of the speaker includes the facial features of the speaker that are made to pronounce sounds of the speaker are shown when those pronounced sounds are output.

18. The method of claim 13, wherein the one or more synthesized images are generated or selected by a process comprising:
   selecting or generating the one or more synthesized images by the receiver using a contact photo of the speaker to generate the one or more synthesized images being selected or generated such that the one or more synthesized images comprise images of the determined speaker that are modified such that facial features of the speaker include facial features of the speaker that are made to pronounce sounds of the speaker to be output from the voice data.

19. The method of claim 18, wherein the replacing of the at least one of the digital images of the chronological sequence that cannot be decoded due to an error or cannot be decoded to meet a pre-selected quality level with the one or more synthesized images on a receiver or en route to the receiver comprises:
   mixing the voice data with the one or more synthesized images and the digital images to output a mixed image sequence that replaces original image sequencing of the chronological sequence such that the one or more synthesized images and the digital images that were decoded without error and were decoded such that the digital images met the pre-selected quality level are outputtable while the one or more digital images that were replaced by the one or more synthesized images are not included in the mixed image sequence; and
   the mixed image sequence configured so that the one or more synthesized images is outputtable such that the modified facial features of the speaker that includes the facial features of the speaker that are made to pronounce sounds of the speaker to be output from the voice data are shown when those pronounced sounds are output.

20. The method of claim 13, comprising:
   mixing the voice data with the one or more synthesized images and the digital images to output a mixed image sequence that replaces original image sequencing of the chronological sequence via a mixer such that the one or more synthesized images and the digital images that were decoded without error and were decoded such that the digital images met the pre-selected quality level are outputtable while the one or more digital images that were replaced by the one or more synthesized images are not included in the mixed image sequence.

* * * * *